United States Patent [19]
Bell et al.

[11] Patent Number: 5,276,472
[45] Date of Patent: Jan. 4, 1994

[54] PHOTOGRAPHIC FILM STILL CAMERA SYSTEM WITH AUDIO RECORDING

[75] Inventors: Cynthia S. Bell, Webster; Paul M. Williams, Rochester; Timothy J. Tredwell, Fairport; Gary L. Robison, Rochester, all of N.Y.

[73] Assignee: Eastman Kodak Company, Rochester, N.Y.

[21] Appl. No.: 794,286

[22] Filed: Nov. 19, 1991

[51] Int. Cl.$^5$ .............................................. G03B 29/00
[52] U.S. Cl. .................................... 354/76; 354/106
[58] Field of Search ............ 369/60, 69; 354/40, 354/76, 106, 105, 68, 41, 109, 108, 21; 358/909

[56] References Cited

U.S. PATENT DOCUMENTS

| | | | |
|---|---|---|---|
| 3,439,598 | 4/1969 | Weitzner et al. | 95/12 |
| 4,270,853 | 6/1981 | Hatada et al. | 354/76 |
| 4,270,854 | 6/1981 | Stemme et al. | 354/76 |
| 4,905,029 | 2/1990 | Kelley | 354/76 |
| 4,977,419 | 12/1990 | Wash et al. | 354/76 |
| 4,983,996 | 1/1991 | Kinoshita | 354/76 |
| 5,023,635 | 6/1991 | Nealon | 354/76 |
| 5,025,283 | 6/1991 | Robison | 354/106 X |
| 5,099,262 | 3/1992 | Tanaka et al. | 354/106 |
| 5,128,700 | 7/1992 | Inoue et al. | 354/76 |

FOREIGN PATENT DOCUMENTS 1-217336  8/1989  Japan.

Primary Examiner—Aristotelis Psitos
Assistant Examiner—Thang V. Tran
Attorney, Agent, or Firm—Francis H. Boos, Jr.

[57] ABSTRACT

Audio to be recorded in a photographic film camera in association with individual exposed frames is first digitized and stored in a temporary storage memory in the camera allowing playback through a speaker mounted in the camera to permit playback review and editing, as needed. When the film is advanced in the camera to the next exposure frame, the digital audio signal is recorded on a magnetic layer formed on the film. At the photofinisher, the digital audio signal is read and converted to suitable encodement format, such as bar code or binary coded blister marks which are impressed on the photoprint for subsequent playback.

1 Claim, 5 Drawing Sheets

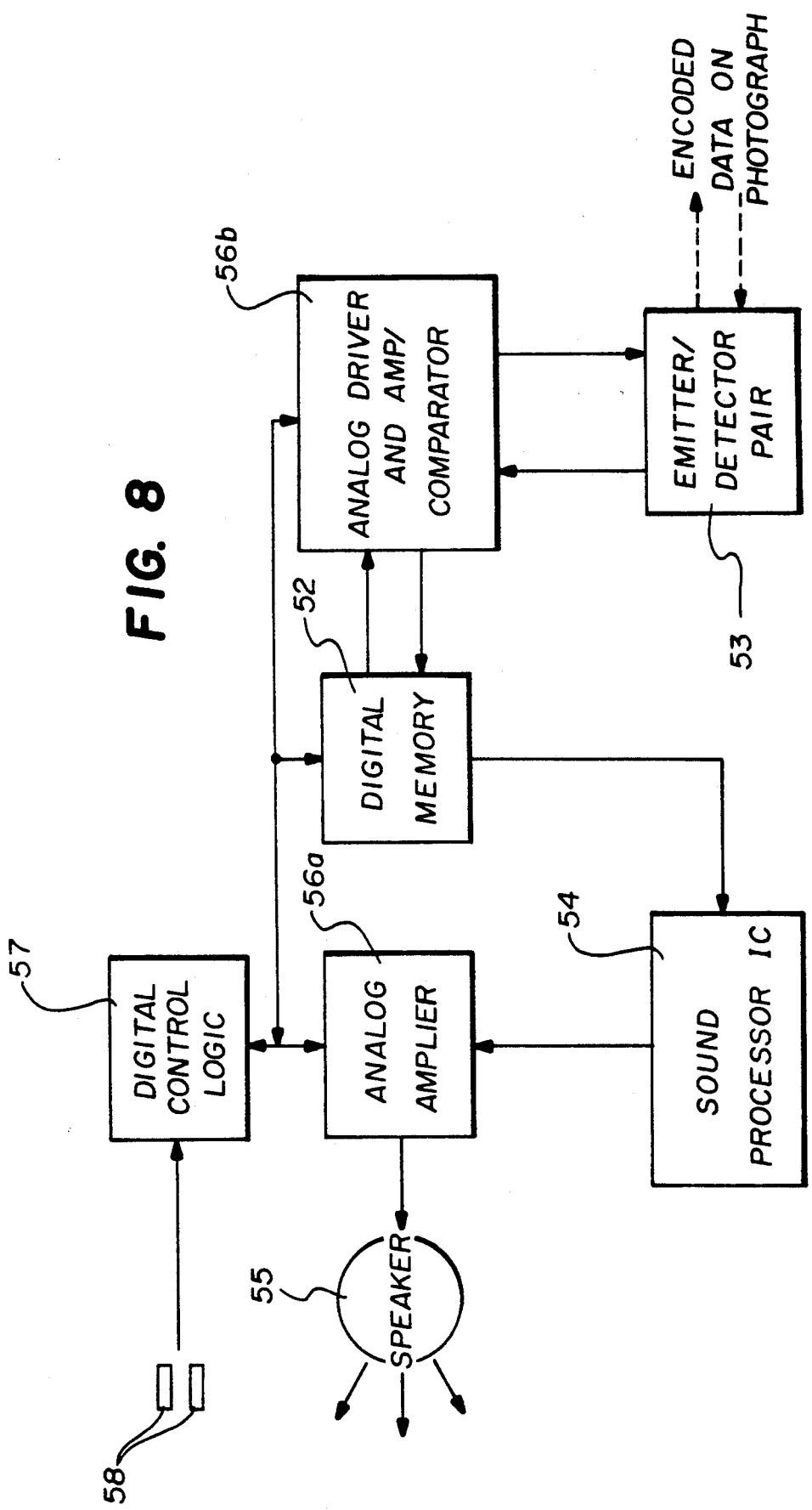

PHOTOGRAPHIC FILM STILL CAMERA SYSTEM WITH AUDIO RECORDING

FIELD OF INVENTION

This invention relates to the field of photographic still cameras and more particularly to a system for providing audio recording and playback in association with individual still photographic prints.

BACKGROUND OF INVENTION

Systems for providing audio recording and playback in association with individual photographic still prints are known in the art. Examples of such systems are disclosed in U.S. Pat. Nos. 3,439,598; 4,270,853; 4,270,854 and 4,905,029. In the '598 patent, a belt driven recording needle inscribes audio information in spiral grooves on the back layer of a multi-laminate slide film. This requires special film and film processing that would allow for removal of the recording film laminate and its attachment to the slide frame for playback by needle-based playback apparatus. In the '854 patent, sound is recorded on an instant print by placing the print, after it has been ejected, into an auxiliary slot in the camera and then proceeding to record the audio on a magnetic strip on the print border. With this system, audio can only be recorded after the picture has been captured and only on an instant print. Also, the only way disclosed for playback is with the camera. The '853 patent discloses a similar apparatus for an instant print camera for recording audio on a magnetic strip in the margin of the instant print paper within a film pack. The '029 patent discloses a microphone and tape recording mechanism to record sound in the camera which is then recorded onto a separate magnetic strip by means of separate recording/playback apparatus. The strip may then be adhesively applied to the photoprint or to the album page adjacent the print and the sound reproduced by means of a special playback apparatus with a reciprocating playback head which is placed against the strip. This arrangement requires a separate tape recording mechanism in the camera.

Additionally, there are three known commercially available systems for combining sound with still photographs. One is the "Talking Picture Frame" sold by Talking Pictures, Inc. which utilizes a special picture frame having a voice recording IC to record the sound in RAM chips in the frame. When the frame is lifted, a microswitch activates the IC to playback the recorded sound.

Another system is the "Mini Box Comm" sold by FotoFonics, Inc. which utilizes a separate record/playback box to record sound on an adhesively backed strip adhered to the photoprint. The print is inserted into the box for recording and playback and the print is in motion during both modes of operation.

The third system is the Mavica electronic camera sold by Sony Corporation which is an electronic camera as opposed to a photographic film camera. Images are acquired by electronic sensors for recording on 2.5" floppy disc memories for subsequent readout by electronic visual display means. Sound is recorded on the floppy disc for subsequent playback along with the recorded image.

A problem with the photographic film systems described above is that the magnetic strips, if kept integral with the prints, are limited to use with instant print cameras. In the case of the system described in U.S. Pat. No. 4,905,029, the sound is recorded on separate strips that may become lost or not easily associated with the prints when they are returned from the photofinisher. In the case of the picture frame the sound is recorded after the print is returned from the photofinisher thus losing the benefit of sound recorded at the time the picture is taken.

Accordingly, there is a need for a simple and compact sound recording system usable with negative or positive film that allows for sound recording at the time of picture taking and that does not become separated from the photographic image.

Another object of the invention is to record the sound with the picture in such a manner as to permanently retain the recorded sound with the film image such that a photofinisher can automatically impress the recorded sound on the photoprint produced by the photofinisher.

It is another object of the invention to provide a sound recording system for still pictures that is not limited to use with instant print cameras.

It is yet another object of the invention to provide a still picture sound recording system that enables the camera user to edit the recorded sound before it is recorded on the image film and sent to the photofinisher.

It is still another object of the invention to provide a still picture recording system that allows the photofinisher to impress the recorded sound on the photoprint in a manner that enables the sound to be played back by compact playback apparatus while the print remains stationary and without the use of bulky reciprocating magnet read head apparatus.

SUMMARY OF INVENTION

These and other objects of the invention are achieved by the provision of a photographic still picture audio recording system adapted to provide audio recording in association with still photographic pictures which comprises a film camera adapted to receive film having a magnetic recording layer thereon. The camera is provided with an audio transducer and signal conversion means for converting audible sound to a digital signal. The camera of the system is further provided with temporary storage means for storing said digital audio signal in the camera and with magnetic recording means for recording said stored digital signal on said film magnetic recording layer. The systems of the invention further includes photofinishing apparatus for producing photographic prints from latent images exposed onto said film in the camera, said photofinishing apparatus including magnetic read means for reading the digital audio signal recorded on the film magnetic layer, means for converting said read digital audio signal into a predetermined encodement format and means for impressing said encodement format onto said photographic prints for subsequent audio playback. In one form of the invention, the encodement format comprises a printed bar code on the front of the photographic print in the margin thereon or on the back of the print. In another form, the encodement format comprises a series of blisters on the print (front margin or backside) which are binary coded in known manner according to the audio information.

BRIEF DESCRIPTION OF DRAWINGS

In the drawings:

FIG. 8 is a schematic block diagram of playback circuits useful in the apparatus of FIG. 7.

DETAILED DESCRIPTION

Figure 1:
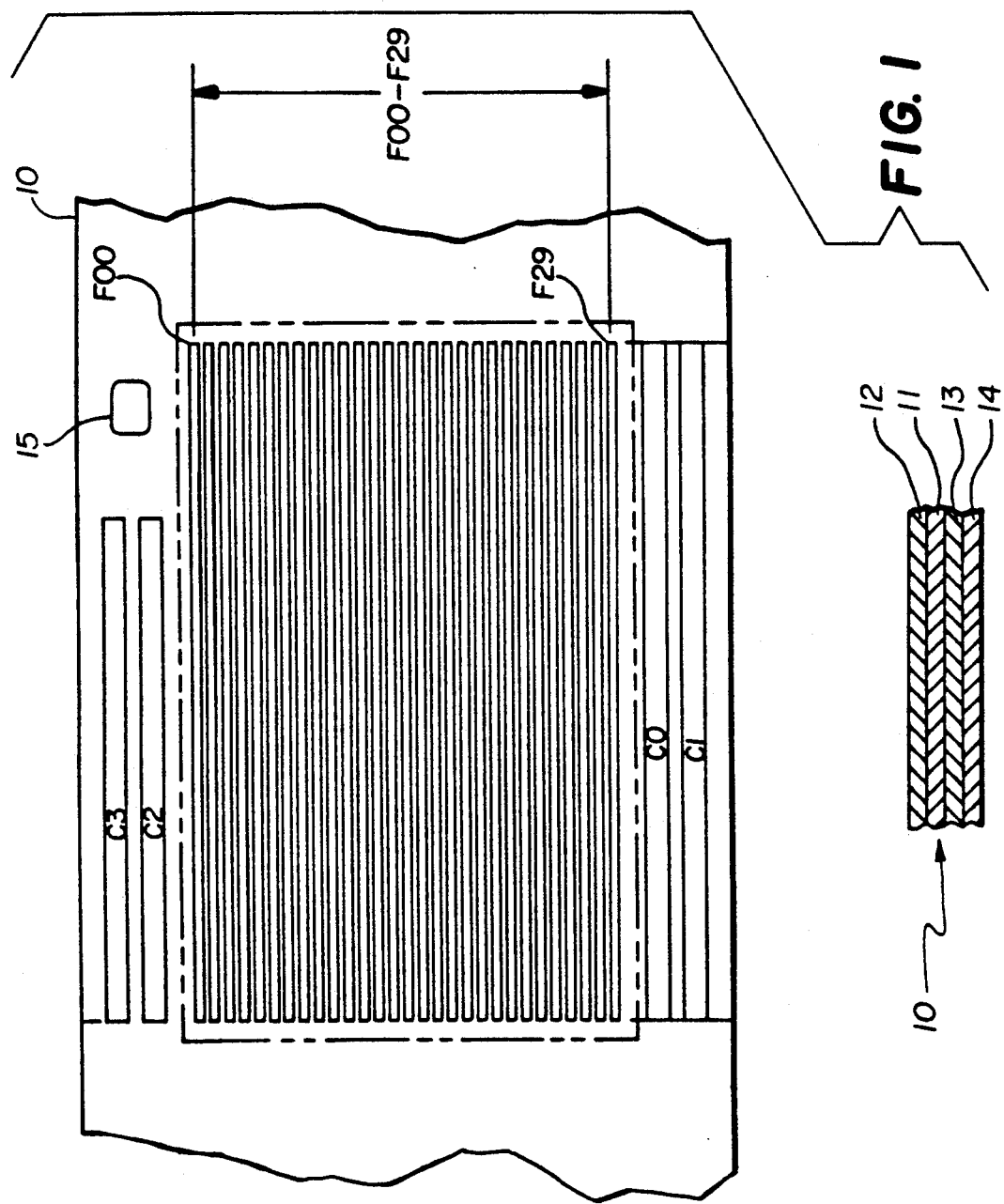
FIG. 1 is a diagram illustrating parallel dedicated tracks in a virtually transparent magnetic layer on film and a cross section of the layers of film particularly adapted for use in a camera of the present invention.

Referring now to FIG. 1, a strip 10 of magnetically coated color negative film, 35 millimeters wide, useful in the present invention includes a base 11, various well-known photo-chemical layers 12 on one side of the base 11 and a virtually transparent magnetic layer 13 on the other side. An anti-static and lubricating layer 14 overlies the magnetic layer 13. The film strip 10 includes perforations 15 along the film edge at regular intervals matching the pitch of a metering pawl in a camera adapted to use the film strip 10.

For purposes of recording data in the magnetic layer 13, each frame of the film strip 10 may be formatted as shown in FIG. 1 and more fully described in commonly assigned U.S. Pat. No. 4,977,419, the disclosure of which is incorporated herein by reference. More specifically, the frame area is divided into a plurality of predetermined longitudinal track locations designated in the drawing as outermost tracks C0-C4 and innermost tracks F00-F29. As described more fully in the '419 patent, certain of the tracks may be reserved for recording of information in the camera using magnetic recording means included in the camera. In addition, other tracks may be reserved for use by the photofinisher. Additionally, the '419 patent indicates that certain of the tracks may be used for recording of audio information. Apparatus for magnetically recording information in the camera is more fully described in the patent and is not repeated here except to the extent elements thereof are relevant to an understanding of the present invention.

Figure 2:
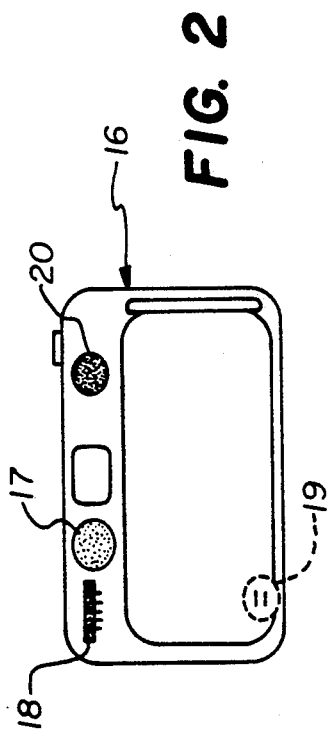
FIG. 2 is a schematic illustration of a camera having audio recording apparatus according to the present invention.
Figure 3:
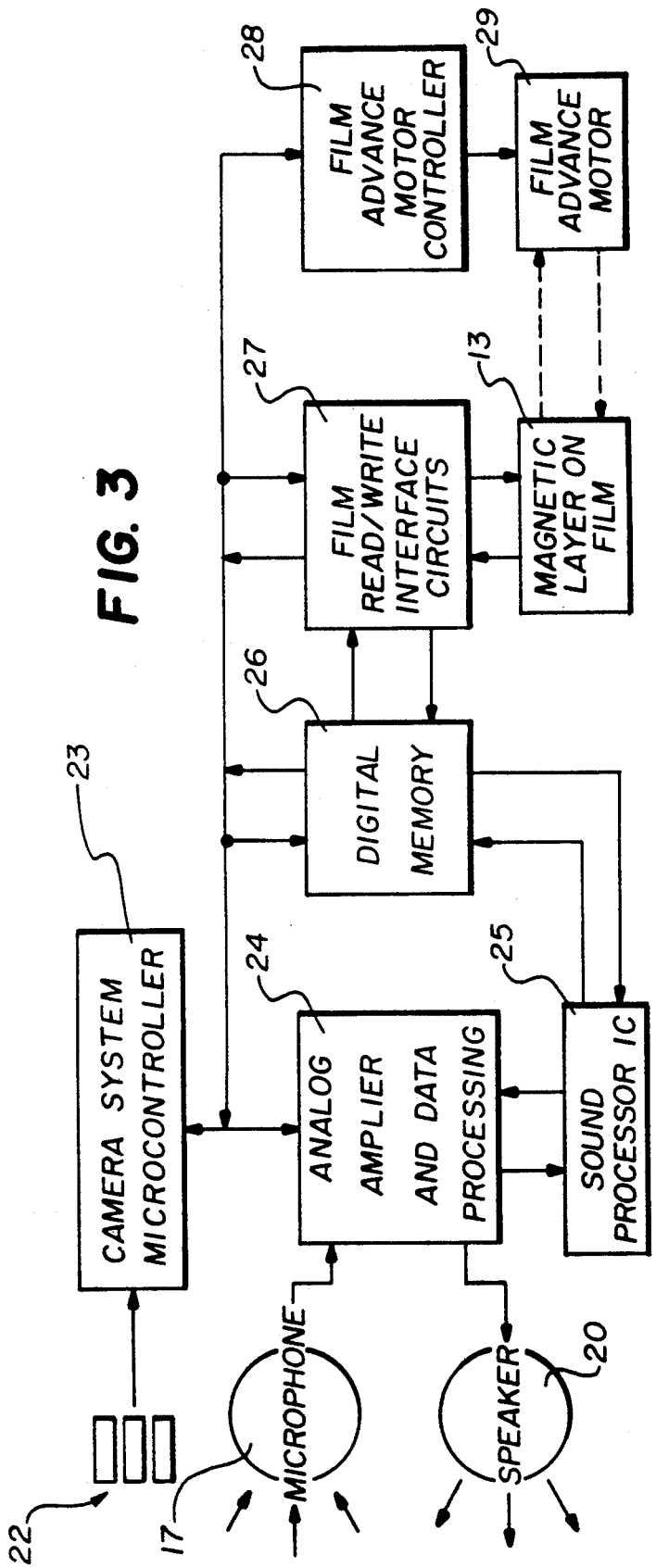
FIG. 3 is a schematic block diagram of audio recording and reproducing circuits useful in the camera of FIG. 2.

Referring to FIG. 2, a camera 16 is shown which is specifically adapted to receive and function with film having a magnetic recording layer such as just described. Camera 16 is provided with a built-in audio transducer, e.g. microphone 17, an internally mounted microchip 18, a magnetic recording head 19 and a miniature speaker 20. Referring to FIG. 3, there is shown an expanded block diagram of the circuits and components included in camera 16, the circuits for the most part being embodied in microchip 18. User inputs 22 comprise buttons or switches which condition the camera system microcontroller 23 to initiate and control the various operating functions of the camera, among them the sound recording and playback functions of the present invention. Microphone 17 and speaker 20 are coupled to analog amplifier and data processing circuit 24 to input and play back the audio. A sound processor integrated circuit (IC) 25 serves to convert analog signals input from microphone 17 into coded digital information suitable for storage in a digital memory 26 and for converting the digital information into analog signals suitable for playback through speaker 20. Sound processor 25 may be a Texas Instruments TMS3477 and memory 26 may be a random access memory (RAM) such as a Hitachi HM628128. One of the functions of memory 26 is to serve as a temporary storage facility for the sound data associated with an individual exposed image frame and, for this purpose, is coupled in the "read" mode to film read/write interface circuits 27 to record the stored audio data onto the magnetic layer 13 (MOF) on film 10. A film advance motor controller 28 operates at appropriate times to cause film advance motor 29 to advance the film in either the frame-to-frame direction or in the film prewind/rewind direction, the latter depending on the nature of the camera involved.

In operation, when it is desired to record sound in association with taking a picture, the camera user selects sound recording via a user input selector switch 22 that causes the camera system microcontroller 23 to set the digital memory to the "write" mode and then enables the analog amplifier and data processing circuit 24 for audio recording. Assuming the user desires to have image-related audio, the user talks into the camera microphone to identify the scene with appropriate information, such as, date, time, f-stop, shutter speed, picture taking location, people in the scene, or aims the microphone to record live sounds from the scene. The data processing circuit 24 and sound processor IC 25 convert the incoming analog signal to coded digital data which is then recorded in the digital memory 26. Audio may be recorded into memory 26 in this manner before, during or after the picture-taking event.

Once having recorded the audio in memory 26, it is then possible to review the recorded information via speaker 20 in the camera. To do this, the user selects the "review" mode by means of a user input switch which causes the microcontroller 23 to set the memory 26 to the "read" mode thereby enabling the sound processor 25 and the analog amplifier and data processing circuit 24 to play back audio through speaker 20. If the recorded sound is not satisfactory, the user can easily change it by simply repeating the recording process described above. It is thus apparent that the use of this temporary buffer memory 26 allows quick audio review and, if necessary, re-recording without movement of the film or any other recording medium in the camera and without the actual taking or print-out of the picture as in the case of instant prints.

Following the taking of a picture, the camera system microcontroller 23 checks the status of the memory 26. If there is audio stored in the memory, it sets the memory to the "read" mode to pass the data from the memory to the film read/write circuits. When microcontroller 23 activates motor controller 28 to cause motor 29 to initiate film advance to the next frame, the data transferred from the memory 26 to the recording interface circuits is recorded on the film magnetic layer during the film advance. Once the data is recorded on the film magnetic layer, microcontroller 23 sets the status of memory 26 to empty thus preparing the memory for the next recording event. Microcontroller 23 may also be adapted to allow the user to select post-image capture audio, in which case the camera system microcontroller does not advance the film following exposure, but waits until after the audio capture on film is completed.

Figure 4:
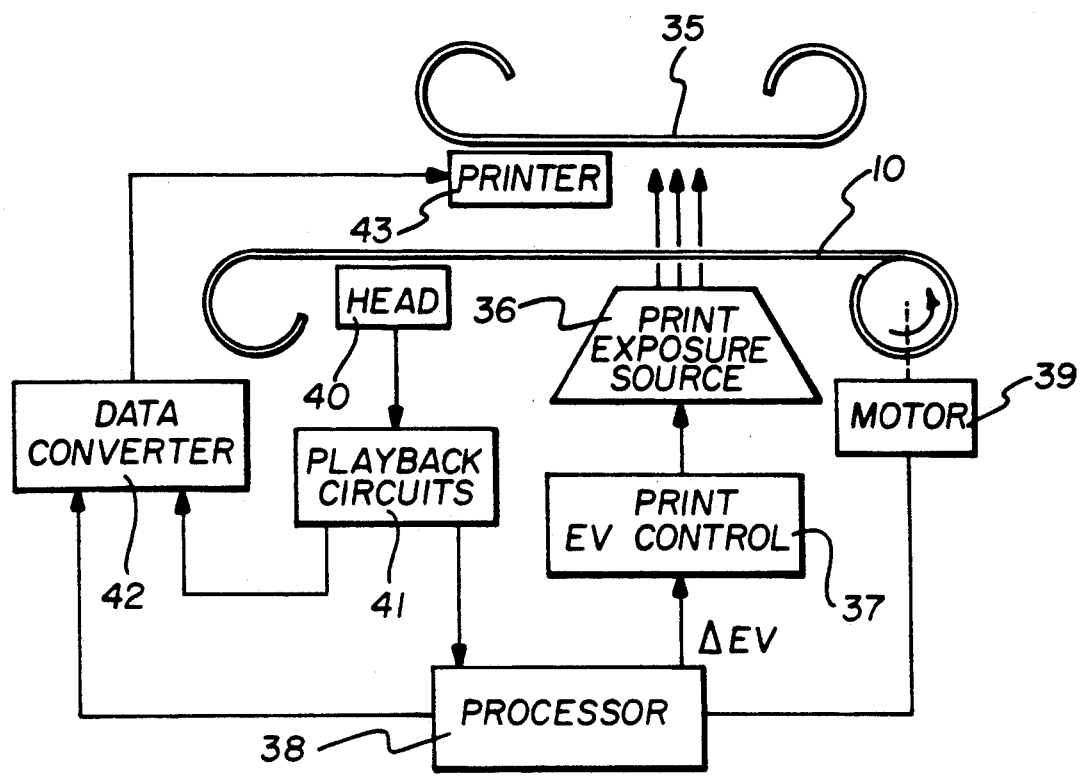
FIG. 4 is a simplified diagram of photofinishing apparatus adapted to impress audio encodement formats on photoprints according to the present invention.
Figure 5:
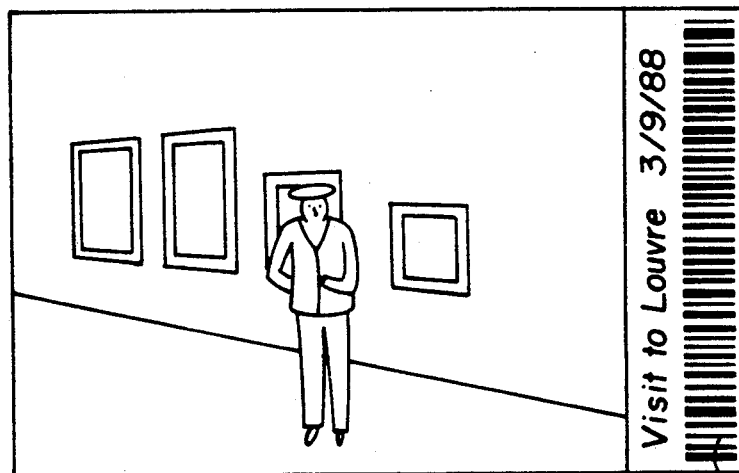
FIG. 5 is an illustration of a photoprint embodying bar code encodement of audio information initially recorded by the camera of FIG. 2.

Referring to FIG. 4, photofinishing apparatus embodying the invention is adapted to process the film exposed by the camera of FIG. 1, namely film strip 10 having a magnetic recording layer on which audio information has been digitally recorded in the camera. Developed images on film strip 10 are exposed onto a strip of photosensitive printing paper 35 with a print exposure source 36 under the control of print EV control 37. A processor 38 operates to control film advance motor 39 and print EV control 37. The photofinishing apparatus also includes a magnetic read head 40, and playback circuits 41 connected thereto. One output of the playback circuits is applied to processor 38 and another output is applied to a data converter circuit 42. As each frame on the film strip 10 is advanced past the magnetic read head 40 in preparation for being exposed to the print exposure source 36, processor 38 monitors the output of the read head through the playback circuit to derive from data recorded on the film magnetic layer information useful in controlling the exposure process. This procedure is described more fully in commonly assigned U.S. Pat. No. 5,006,878, the disclosure of which is incorporated herein by reference. Additionally, and in accordance with a particular feature of the invention, digital audio signal information recorded on the film magnetic layer of film 10 is applied from the playback circuits 41 to signal converter circuit 42 wherein there is generated an encodement format signal used to drive printer 43 for impressing the encodement format onto the photoprint. Printer 43, for example, may be an inkjet printer adapted to respond to the encodement format signal to print a corresponding bar code format 45 on the photoprint such as is shown in FIG. 5. The bar code encoded information may be printed in the margin of the photoprint, as shown, or it may be printed alternatively on the back side of the print. The printer may also respond to frame specific data such as date and time to print the information in eye readable form on the print as shown.

Figure 6:
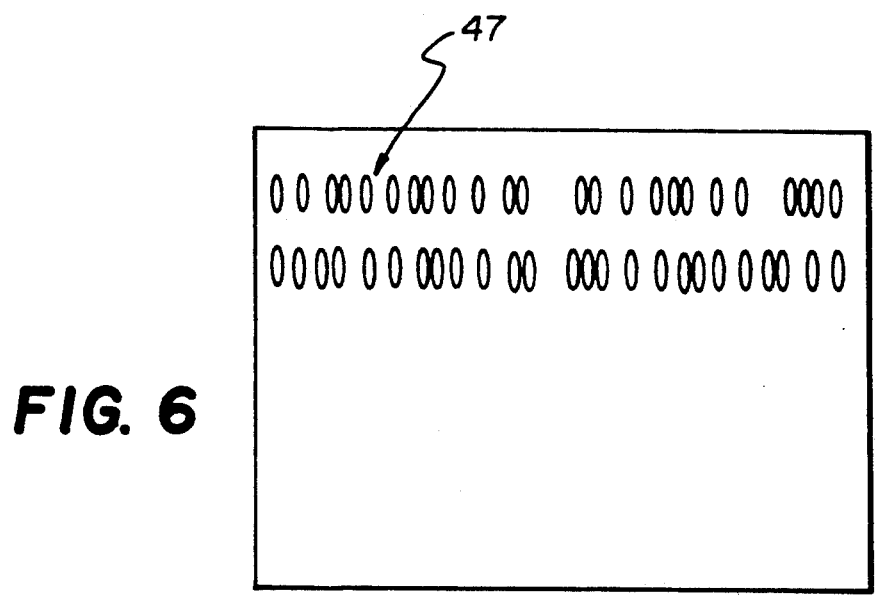
FIG. 6 is an illustration of the back of a photoprint embodying blister encodement of the audio information initially recorded by the camera of FIG. 2.

Alternatively, printer 43 may comprise blister forming apparatus which operates to create blister marks 47, as shown schematically in FIG. 6, on the plastic coating normally used on the photoprint paper. Such blistering apparatus operates to create localized heating of spots on the coating using, for example, a laser beam to form a binary encodement format on the coating.

Having impressed the audio information on the photoprint in the form of a suitable encodement format as described above, the sound subsequently may be reproduced by means of a portable, hand-held playback device 50 shown in FIG. 7 having a form factor about the same as a credit card and only slightly thicker. Such a device comprises a button battery power source 51, a memory storage IC 52, an optical emitter/decoder pair 53, a sound data decoder IC 54, a planar speaker 55, analog drive circuits 56 and digital control logic 57.

Figure 7:
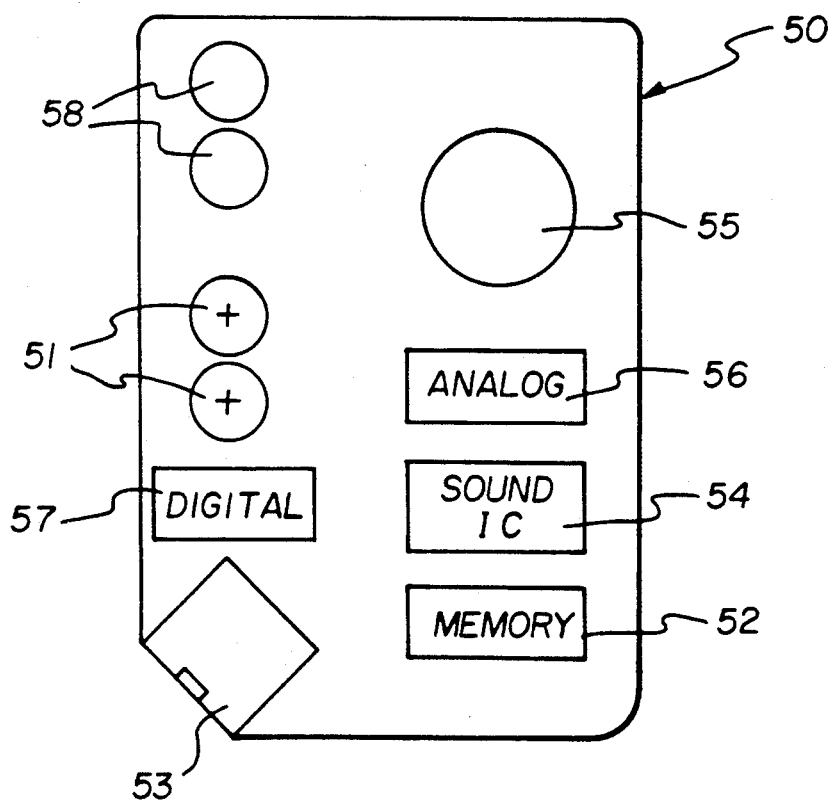
FIG. 7 is a simplified diagram of hand-held apparatus for reading audio encodement from a photoprint bearing audio encodement of FIGS. 5 or 6.

Referring to FIG. 8, functional block diagram of circuitry for the device of FIG. 7 comprises user input buttons 58 coupled to digital control logic unit 57 which controls the operation of digital memory 54 and an analog unit 56 which includes speaker amplifier 56a and analog drive and amplitude comparator unit 56b. The latter unit is coupled to the emitter/detector pair device 53 which operates to sense the encodement format on the photoprint and to produce a digital output signal which is temporarily stored in memory unit 52. To play back the audio from the encodement format on the photoprint, the user enables the hand held reader by pressing an "on" switch of user inputs 58 which causes logic unit 57 to set memory 52 to the "store" mode and also to enable an LED (not shown) to indicate the "power on" status. Next the user scans the optical emitter of emitter/detector pair 53 over the encoded audio information, either the blister pattern or the bar code pattern. Preferably the data is encoded in a self-clocking format such as is described in U.S. Pat. No. 4,876,697 or in U.S. Pat. No. 4,954,825, the disclosures of which are incorporated herein by reference, in order to make the reader scanspeed tolerant. While scanning, the unit decodes the printed pattern back into digital data and stores it in the local memory. Once scanned, the photoprint is held in a comfortable manner to be observed while the audio player input switch is activated. The digital control logic 57 then proceeds to set the memory 52 to read, and to enable the sound processor IC 54 to convert the digital signal data to an audio signal which is passed via the amplifier to the speaker. A particular advantage of such an arrangement is that the user can replay the audio as many times as desired without rescanning the photoprint, since the data is retained in the digital memory 52 until power is removed or until the user clears the memory via the user inputs 58 and control logic unit 57

The invention has been described in detail with particular reference to a presently preferred embodiment, but it will be understood that variations and modifications can be effected within the spirit and scope of the invention.

What is claimed is:

1. Photographic film system with audio recording and playback comprised of a photographic film camera adapted to receive film having a magnetic recording layer thereon, said camera have audio transducer and signal conversion means for converting audible sound to a digital signal, temporary storage means for storing said digital audio signal in the camera and magnetic recording means for recording said stored digital signal on said film magnetic recording layer and photofinishing apparatus for producing photographic prints from latent images exposed onto said film in the camera, said photofinishing apparatus including magnetic read means for reading the digital audio signal recorded on the film magnetic layer, means for converting said read digital audio signal into a predetermined encodement format and means for impressing said encodement format onto said photographic prints for subsequent audio playback; the system characterized by:

a self-contained hand-held scanner playback device independent of said camera including an optical sensor, memory and audio reproduction unit adapted to scan said encodement format on said photographic prints to generate digital audio data signals for storage in said memory and for subsequent playback independent of said photographic print.

* * * * *